(12) United States Patent
Walker et al.

(10) Patent No.: US 11,914,516 B1
(45) Date of Patent: Feb. 27, 2024

(54) MEMORY SIDE CACHE REQUEST HANDLING

(71) Applicant: Micron Technology, Inc., Boise, ID (US)

(72) Inventors: Dean E. Walker, Allen, TX (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/823,323

(22) Filed: Aug. 30, 2022

(51) Int. Cl.
*G06F 12/0855* (2016.01)

(52) U.S. Cl.
CPC ................ *G06F 12/0855* (2013.01)

(58) Field of Classification Search
None
See application file for complete search history.

(56) References Cited

U.S. PATENT DOCUMENTS

| 5,553,310 A | * | 9/1996 | Taylor | G06F 13/364 710/240 |
| 2008/0301372 A1 | * | 12/2008 | Kojima | G06F 12/128 711/E12.071 |
| 2018/0137075 A1 | * | 5/2018 | Linderman | G06F 13/4022 |

* cited by examiner

*Primary Examiner* — Yaima Rigol
(74) *Attorney, Agent, or Firm* — Schwegman Lundberg & Woessner, P.A.

(57) ABSTRACT

System and techniques for memory side cache request handling are described herein. When a memory request is received, a cache set for the memory request is determined. Here, the cache set has multiple ways and each way corresponds to a cache line. It can be detected that a way of the multiple ways is not ready for the memory request. In this case, a representation of the memory request is stored in a queue of multiple queues based on an interface upon which the memory request was received and the present ways of the cache set. Entries from the multiple queues can be dequeued in a defined order to determine a next memory request to process. The defined order gives priority to memory requests for a present way and then for external over internal requests.

24 Claims, 9 Drawing Sheets

| | | |
|---|---|---|
| CACHE SET 0 (ADDRESS 00XXXX) | CACHE LINE | WAY 0 TAG + DATA |
| | CACHE LINE | WAY 1 TAG + DATA |
| | CACHE LINE | WAY 2 TAG + DATA |
| | CACHE LINE | WAY 3 TAG + DATA |
| CACHE SET 1 (ADDRESS 01XXXX) | CACHE LINE | WAY 0 TAG + DATA |
| | CACHE LINE | WAY 1 TAG + DATA |
| | CACHE LINE | WAY 2 TAG + DATA |
| | CACHE LINE | WAY 3 TAG + DATA |
| CACHE SET 2 (ADDRESS 10XXXX) | CACHE LINE | WAY 0 TAG + DATA |
| | CACHE LINE | WAY 1 TAG + DATA |
| | CACHE LINE | WAY 2 TAG + DATA |
| | CACHE LINE | WAY 3 TAG + DATA |
| CACHE SET 3 (ADDRESS 11XXXX) | CACHE LINE | WAY 0 TAG + DATA |
| | CACHE LINE | WAY 1 TAG + DATA |
| | CACHE LINE | WAY 2 TAG + DATA |
| | CACHE LINE | WAY 3 TAG + DATA |

MEMORY SIDE CACHE REQUEST HANDLING

STATEMENT REGARDING GOVERNMENT SUPPORT

This invention was made with Government support under Agreement No. DE-NA0003525, awarded by SANDIA II. The Government has certain rights in the invention.

TECHNICAL FIELD

Embodiments described herein generally relate to computer memory and more specifically to memory side cache request handling.

BACKGROUND

Memory devices for computers or other electronic devices can be categorized as volatile and non-volatile memory. Volatile memory uses power to maintain its data (e.g., is periodically refreshed), and includes random-access memory (RAM), dynamic random-access memory (DRAM), or synchronous dynamic random-access memory (SDRAM), among others. Non-volatile memory generally retains stored data in the absence of a power source, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In an example, non-volatile memory media can be used to build a system with a persistent memory model.

Memory devices can be coupled to a host (e.g., a host computing device) to store data, commands, or instructions for use by the host while the computer or electronic system is operating. For example, data, commands, or instructions can be transferred between the host and the memory device during operation of a computing or other electronic system.

Various protocols or standards can be applied to facilitate communication between a host and one or more other devices such as memory buffers, accelerators, or other input/output devices. In an example, an unordered protocol, such as Compute Express Link (CXL), can be used to provide high-bandwidth and low-latency connectivity.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 4 illustrates an example of an associative cache, according to an embodiment.

DETAILED DESCRIPTION

Figure 1:
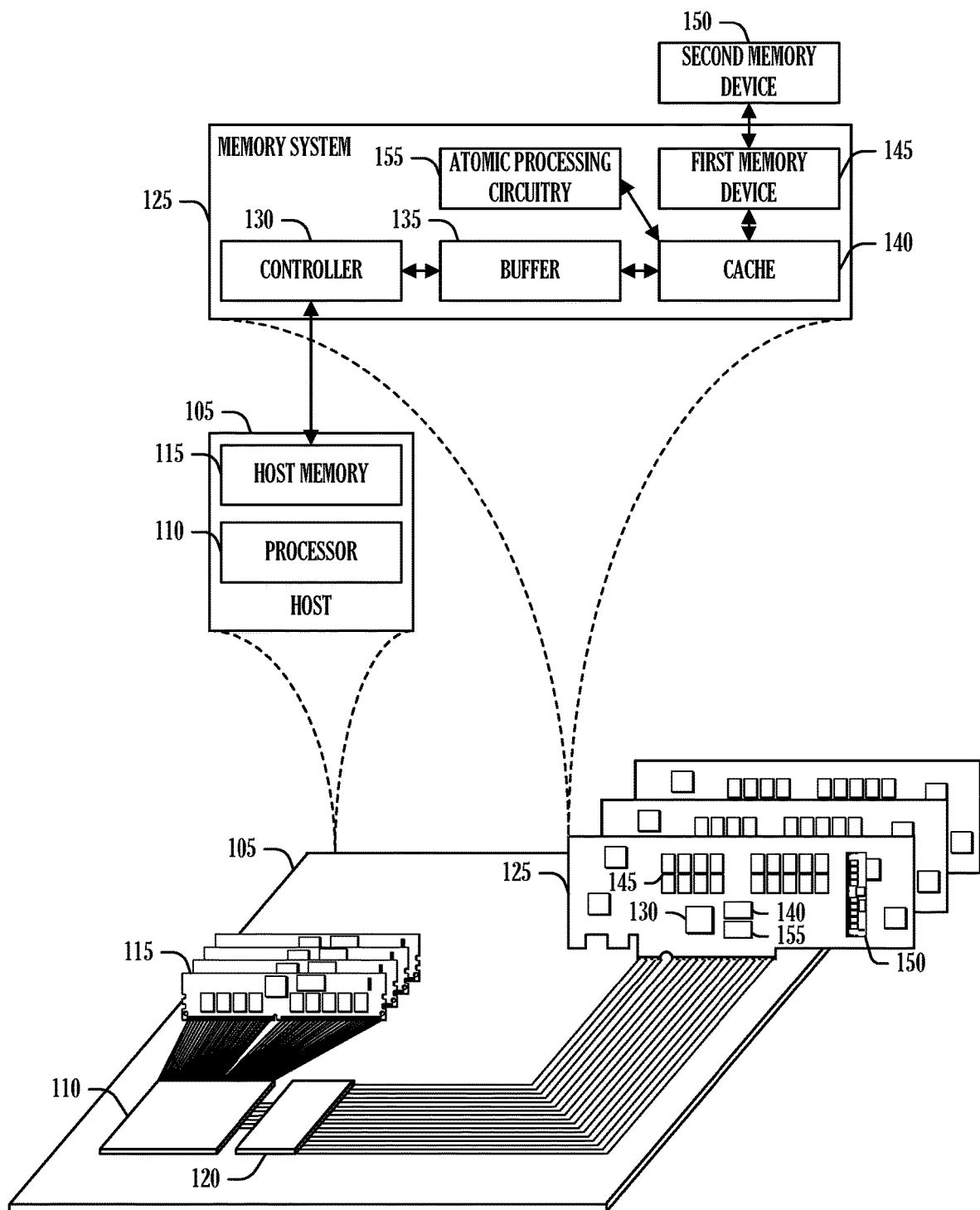
FIG. 1 illustrates an example of an environment including a system for memory side cache request handling, according to an embodiment.

Compute Express Link (CXL) is an open standard interconnect configured for high-bandwidth, low-latency connectivity between host devices and other devices such as accelerators, memory buffers, or smart input-output (I/O) devices. CXL was designed to facilitate high-performance computational workloads by supporting heterogeneous processing and memory systems. CXL provides memory semantics and mechanisms for cache coherency on top of PCI Express (PCIe)-based I/O semantics for optimized performance.

CXL can be used in applications such as artificial intelligence, machine learning, analytics, cloud infrastructure, edge computing devices, communication systems, and elsewhere, to provide flexible connectivity to memory or accelerators for a host processor platform. Data processing in such applications can use various scalar, vector, matrix, or spatial architectures that can be deployed in CPU, GPU, FPGA, smart NICs, or other accelerators that can be coupled using a CXL link. Near memory accelerators, in which an accelerator is collocated with memory, provide low latency processing while expanding system capabilities.

CXL supports dynamic multiplexing using a set of protocols that includes I/O (CXL.io, based on PCIe), caching (CXL.cache), and memory (CXL.memory) semantics. In an example, CXL can be used to maintain a unified, coherent memory space (e.g., cache coherence) between the CPU (e.g., a host device or host processor) and any memory managed (e.g., at) the CXL device. This configuration enables the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL devices that include both memory and an accelerator can be termed "CXL type-2" devices. Although the accelerators of such devices can be used by themselves through the CXL interface, often these accelerators provide near-memory compute to reduce round-trip latency to a host processor. In accordance with current CXL standards, CLX memory requests (e.g., external requests) take priority over other requests, such as network-on-chip (NOC) or other internal requests. This priority requires CXL memory requests to make forward progress independent of any other device activity, such as activity by an accelerator. That is, a CXL memory request cannot block indefinitely waiting for a non-CXL memory request to complete. Separately managing memory controller workflow with this restriction when both CXL and non-CXL requests are being made can be a complex process.

To address the complexity between CXL (or other external) requests and accelerator (or other internal requests), separate processing queues are maintained for deferred requests. Requests that are not deferred proceed as soon as they arrive in the memory controller because there is no resource contention. Thus, in these cases, there is no opportunity, for example, for an internal request to block the progress of an external request. However, when resource contention is present, the request will be deferred until the contention is resolved. An elegant solution to managing the different processing priorities of external and internal requests includes queuing each in separate deferral queues, whereby priority of the external requests can be easily maintained by prioritizing extraction of requests from the external queue. Moreover, order of operations on a memory address can be maintained by judicious selection of requests from the external and internal queues all while preventing an internal request from blocking (e.g., preventing forward progress on) an external request.

It is generally important to maintain ordering of requests, such as read versus write requests, for data integrity or proper program execution in some CXL device accelerators. As noted herein, lists for cache ways and a cache set are used to hold deferred requests. By controlling into which lists, or queues, requests are placed, correct request process ordering can be ensured. For example, if a request for a specific memory way is in a set deferred request list (e.g., a general cache set queue or general deferred queue), then all future requests for that way can be pushed into the deferred request list. Similarly, if a request for a memory way is in a way deferred request list (e.g., queue specific to cache line or cache way), then all future requests for that way can be pushed into the deferred request list. A variety of other conditional queueing scenarios are provided herein. In an example, the conditions are ascertained from cache tag state for a hit in the cache.

By effectively queuing the pending requests in the tag-cache associated with the respective cache-line, or set-associative way in a cache set, enables a way to process the sequential input request queue and only retry pending requests once a set-associative way is available for eviction or processing of subsequent requests. This provides a performance advantage by limiting the number of non-productive cache access cycles. In an example, linked lists of pointers into a directory-based storage structure are used to store memory request details with only an index, or identifier, into the directory structure used in the various queues, reducing data requirements of the queues and internal bandwidth to move memory requests between queues. In an example, the linked list head and tail pointers of the queues can be stored in the tag-cache.

With a sufficiently deep directory-based request storage structure and linked list storage structure, the incoming requests can continue to be efficiently processed and assigned to their respective cache-set or cache way queue. This prevents those requests from consuming additional cache bandwidth until the request can make forward progress. Using the devices and following the techniques described herein can ensure in-order processing of requests for a memory line in the presence of evicted pending recall states, or other memory line state conditions. Additional details and examples are provided below.

FIG. 1 illustrates an example of an environment including a system for memory side cache request handling, according to an embodiment. The system includes a host device 105 and a memory system 125. The host device 105 includes processor 110 (e.g., a central processing unit (CPU)) and host memory 115. In an example, the host device 105 is, or is part of, a host system such as a server computer, workstation, personal laptop computer, a desktop computer, a digital camera, a smart phone, a memory card reader, or Internet-of-thing enabled device, among others. The processor 110 can include one or more processor cores, a system of parallel processors, or other CPU arrangements.

The memory system 125 includes a controller 130, a buffer 135 (e.g., internal state memory), a cache 140, and a first memory device 145. The first memory device 145 can include, for example, one or more memory modules (e.g., single in-line memory modules, dual in-line memory modules, etc.). The first memory device 145 can include volatile memory or non-volatile memory. The first memory device 145 can include a multiple-chip device that comprises one or multiple different memory types or modules. In an example, the system includes a second memory device 150 that interfaces with the memory system 125 and the host device 105.

The host device 105 can include a system backplane and can include a number of processing resources (e.g., one or more processors, microprocessors, or some other type of controlling circuitry). The system can optionally include separate integrated circuits for the host device 105, the memory system 125, the controller 130, the buffer 135, the cache 140, the first memory device 145, the second memory device 150, any one or more of which can comprise respective chiplets that can be connected and used together. In an example, the system includes a server system or a high-performance computing (HPC) system or a portion thereof. Embodiments of the host device 105 can be implemented in Von Neumann or in non-Von Neumann architectures, which can include one or more components (e.g., CPU, ALU, etc.) often associated with a Von Neumann architecture, or can omit these components.

In an example, the first memory device 145 can provide a main memory for the system, or the first memory device 145 can comprise accessory memory or storage for use by the system. In an example, the first memory device 145 or the second memory device 150 includes one or more arrays of memory cells, e.g., volatile or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 145 includes persistent or non-volatile memory, the first memory device 145 can include a flash memory device such as a NAND or NOR flash memory device. The first memory device 145 can include other non-volatile memory devices such as non-volatile random-access memory devices (e.g., NVRAM, ReRAM, FeRAM, MRAM, PCM). Some memory devices—such as a ferroelectric RAM (FeRAM) devices that include ferroelectric capacitors—can exhibit hysteresis characteristics, such as a 3-D Crosspoint (3D XP) memory device, or combinations thereof.

In an example, the interface 120 can include any type of communication path, bus, interconnect, or the like, that enables information to be transferred between the processor 110, or other devices of the host device 105, and the memory system 125. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, or a miniature serial advanced technology attachment (mSATA) interface, among others. In an example, the interface 120 includes a PCIe 5.0 interface that is compliant with the compute express link (CXL) protocol standard. Accordingly, in some embodiments, the interface 120 supports transfer speeds of at least 32 GT/s.

CXL is a high-speed central processing unit (CPU)-to-device and CPU-to-memory interconnect designed to enhance compute performance. CXL maintains memory coherency between the CPU memory space (e.g., the host memory 115 or caches maintained by the processor 110) and memory on attached devices or accelerators (e.g., the first memory device 145 or the second memory device 150). This arrangement enables resource sharing at higher performance, reduced software stack complexity, and lower overall system cost than other interconnect arrangements. CXL is an industry open standard interface for high-speed communications to accelerators that are increasingly used to complement CPUs in support of emerging data-rich and compute-intensive applications such as artificial intelligence and machine learning. The memory system 125 is illustrated with atomic processing circuitry 155 as an accelerator in order to perform near-memory operations. In general, the atomic memory operations (AMOs) performed by the atomic processing circuitry 155 include such small operations as incrementing a number at a memory address or multiply number in two memory addresses, etc. While AMOs are generally used for such operations, the manipulation of memory is not so restricted. For example, modern artificial neural network architectures generally involves the application of small additive or multiplicative operations or thresholding across vast swaths of artificial neurons. Because the computations are usually simple, but the data large, near memory execution of such operations is possible and beneficial given the illustrated architecture.

In an example, the controller 130 comprises a media controller such as a non-volatile memory express (NVMe) controller. The controller 130 can be configured to perform operations such as copy, write, read, error correct, etc. for the first memory device 145. In an example, the controller 130 can include purpose-built circuitry or instructions to perform various operations. That is, in some embodiments, the controller 130 can include circuitry or can be configured to perform instructions to control movement of data or addresses associated with data such as among the buffer 135, the cache 140, or the first memory device 145 or the second memory device 150.

In an example, at least one of the processor 110 or the controller 130 comprises a command manager (CM) for the memory system 125. The CM can receive, such as from the host device 105, a read command for a particular logic row address in the first memory device 145 or the second memory device 150. In an example, the CM can determine that the logical row address is associated with a first row based at least in part on a pointer stored in a register of the controller 130. In an example, the CM can receive, from the host device 105, a write command for a logical row address, and the write command can be associated with second data. In an example, the CM can be configured to issue, to non-volatile memory and between issuing the read command and the write command, an access command associated with the first memory device 145 or the second memory device 150. In an example, the CM can issue, to the non-volatile memory and between issuing the read command and the write command, an access command associated with the first memory device 145 or the second memory device 150.

In an example, the buffer 135 comprises a data buffer circuit that includes a region of a physical memory used to temporarily store data, for example, while the data is moved from one place to another. The buffer 135 can include a first-in, first-out (FIFO) queue in which the oldest (e.g., the first-in) data is processed first. In some embodiments, the buffer 135 includes a hardware shift register, a circular buffer, or a list.

In an example, the cache 140 comprises a region of a physical memory used to temporarily store particular data from the first memory device 145 or the second memory device 150. Generally, the cache provides faster access to data than the backing memories. The cache 140 can include a pool of data entries. In an example, the cache 140 can be configured to operate according to a write-back policy in which data is written to the cache without the being concurrently written to the first memory device 145. Accordingly, in some embodiments, data written to the cache 140 does not have a corresponding data entry in the first memory device 145. This can occur when, for example, data is written to the cache and deleted before a write-back is triggered to write the data into the first memory device 145, for example.

In an example, the cache 140 is implemented as a multi-way associative cache. Here, cache entries are divided by some portion of a memory address (e.g., a set number of significant bits). A group of cache entries (e.g., cache lines or ways), called a cache set herein, can be co-associated with a same bit-set from the memory address. Usually, the number of ways in a cache set is less than the total number of memory addresses to which the ways are associated. Thus, a way can be evicted to be associated with a new memory address in the range at various points. FIG. 4 illustrates some elements of this type of associate cache.

In an example, the controller 130 can receive write requests involving the cache 140 and cause data associated with each of the write requests to be written to the cache 140. The controller 130 can similarly receive read requests and cause data that is stored in, for example, the first memory device 145 or the second memory device 150, to be retrieved and written to, for example, the host device 105 via the interface 120. In an example, the controller 130 processes all requests for memory it controls through the cache 140. Thus, a read request will first check the cache 140 to determine if the data is already cached. If not, a read to the first memory device 145 is made to retrieve the data. The data is then written to the cache 140. In an example, the data is then read from the cache 140 and transmitted to the processor 110. Working exclusively through the cache can simplify some elements of the controller 130 hardware at the cost of a little latency.

The following operations are described as be implemented by the controller 130 for the sake of simplicity. However, the cache 140 can include circuitry to perform some or all of these operations. The controller 130 is configured to prioritize external (e.g., host requests, CXL memory requests, etc.) over internal requests (e.g., accelerator requests) via a queueing system that differentiates between the two types of requests. Specifically, the controller 130 is configured to maintain separate external request queues and internal request queues. Prioritization is given to the external request queue without complicated operation analysis or priority logic. FIG. 3, FIG. 4, FIG. 5, FIG. 6, and FIG. 7 illustrate various aspects of this multi queue system.

In short, when a request is received, a determination is made as to whether the address in the request maps to a current way of a cache set. Because a cache set represents a range of address well beyond the number of ways, it is possible that the memory address of the request does not map to a current way. If the request maps to a current way, and the way is not busy, then the request is executed. If the way is busy, the request is placed into one of two a cache way queues for that way; either the cache way external queue if the request is an external request or the cache way internal queue if the request is an internal request. As the way becomes free (e.g., not busy because a previous request completes), a next request from the cache way queue is popped to execute on the way. Generally, the cache way external queue is emptied before a next request from the cache way internal queue is popped, thus ensuring that no internal request blocks forward progress of the external requests.

If there is no current way that matches the request, then the request is placed in the cache set external queue or the cache set internal queue depending on whether the request is an external request or an internal request. Usually, once a way is free (e.g., not busy and with empty cache way queues), the way can be evicted and a next request from the cache set queue-again, usually the cache set external queue first-popped. The memory line corresponding to the newly popped request is loaded into a way and the request can execute. In this manner, proper execution order and blocking given the priority of external requests over internal requests can be maintained.

To implement the memory side cache handling discussed herein, the controller 130 (or the cache 140) is configured to determine a cache set for a memory request. As used herein, a cache set matches a range of memory addresses and has a set number of ways, or cache lines, in the cache set. An example of the set associative arrangement of cache lines is illustrated in FIG. 4. The controller 130 determines the cache set for the memory request from the address, or addresses, included in the memory request.

The controller 130 is configured to detect that a way of the multiple ways in the cache set is not ready for the memory request. There are at least two circumstances as to why a way is not ready. First, the way can be busy completing another memory request. Second, no current way in the cache set corresponds to the memory address. In the first case, there is a present way that represents the memory line referred to in the memory request. In the second case, a way will need to be prepared (e.g., evicted and loaded) before the way is capable of servicing the memory request. Detecting that the way is not ready can include reading tags of the cache ways to determine whether a way matches the address of the memory request and, if so, whether the way is busy.

In an example, a directory can be used to store memory request information to avoid transferring the complete memory request data between queues. Here, an identifier of which entry in the directory that holds the memory request is used in the various queues. Thus, the controller 130 is configured to write the memory request into the directory upon receipt and then use the identifier for the entry of the memory request in the directory data structure to track the memory request. Whenever information about the memory request is needed for further processing, such as a data payload in a write, the identifier is used to find the entry and the relevant portion of the memory request is read. This can reduce the size of storing the memory request in various processing positions to that of the identifier and also reduces bandwidth in moving a memory request between processing elements.

In an example, where the memory request is stored in the directory data structure, to detect that the way is not ready for the memory request, the controller 130 is configured to use the identifier of the entry to retrieve an address from the memory request. The controller 130 is configured to then locate the way based on the address. If no way can be located, then the way is not ready. If the way is located, the controller 130 is configured to read status data (e.g., tag state) of the way to determine if the way is busy. If the way is not busy, in an example, the controller 130 is configured to determine whether a queue (e.g., defer queue) for the way is empty. As described below, the queue maintains pending requests. If the way is not busy, but the queue is not empty, the memory request should not be executed because it will be out-of-order given the previous requests that are in the queue.

The controller 130 is configured to store the memory request in a queue of multiple queues based on an interface upon which the memory request was received and the present (e.g., current) ways of the cache set. The interface of receipt can be important when, as is the case of a CXL device, requests received in the CLX interface (e.g., the interface 120) cannot be denied forward progress based on other requests, such as those made by the atomic processing circuitry 155 or other accelerators or components of the memory system 125. In these examples, there are different queues for different interfaces. Thus, processing order for individual requests need not be considered, but rather prioritizing CXL requests can be accomplished by processing the CXL queue first.

Figure 6:
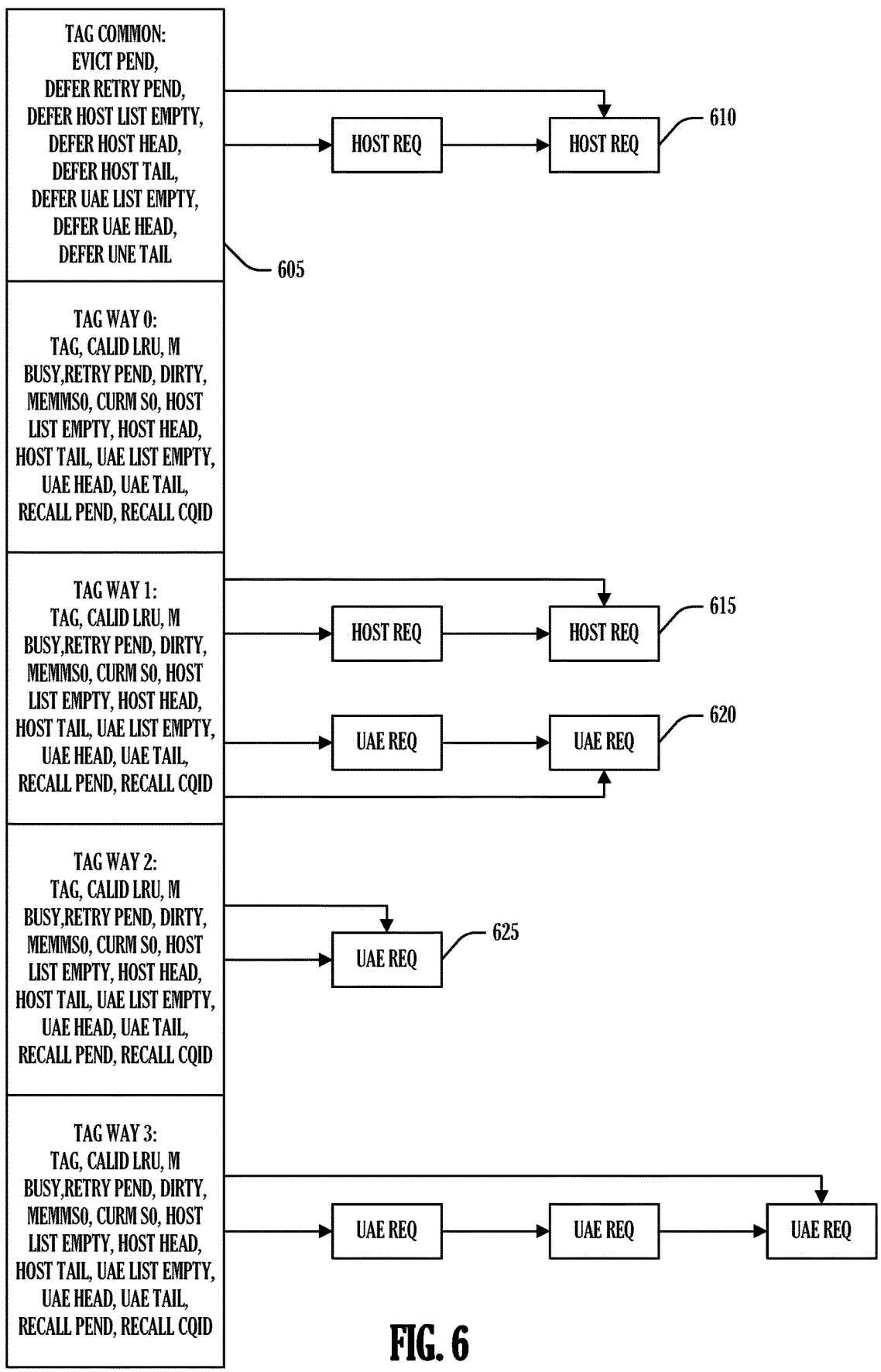
FIG. 6 illustrates an example of tag pointers to request queues, according to an embodiment.

In an example, the multiple queues include a queue that does not correspond to a present way of the cache line. This queue is the cache set queue, or common tag, for the cache set. Again, there can be a different cache set queues for each interface (e.g., a cache set internal queue and a cache set external queue). Thus, in an example, the multiple queues include a queue in each way and the common tag for each interface of a memory device. Such an organization is illustrated in FIG. 6. In an example, each queue of the multiple queues is a linked list. In an example, a head and tail pointer is stored for each list. In an example, the pointers for the cache set queue are stored in the common tag. In an example, the pointers for a way are stored in a tag of the way.

The controller 130 is configured to dequeue entries from the multiple queues in a defined order to determine a next memory request to process. In an example, the defined order gives priority to memory requests that match a present way over memory requests that do not match a present way. Thus, way specific defer queues are processed until empty before a cache set queue is processed at all. In an example, the defined order gives priority to memory requests from an external interface over memory requests from an internal interface. This order ensures that, in the case of CXL, the CXL requests are processed first. After the CXL queue is empty, the internal requests can be processed.

In an example, the defined order dequeues entries from queues corresponding to an external interface to the memory device and a present way of the cache line before queues corresponding to an internal interface to the memory device and a present way. This order ensures that a memory request is only deferred once. That is, a backlog on a present way is emptied before a cache line is evicted and a cache set request that was deferred is processed. Thus, the defined order dequeues entries from the queues corresponding to the internal interface of a present way before queues corresponding to the external interface and the common tag. In an example, the defined order dequeues entries from the queues corresponding to the external interface and the common tag before queues corresponding to the internal interface and the common tag. Put together, these examples process present way queues before common queues. If queues are at the same level (e.g., both are way queues of a present way), then external interface queues are processed before internal interface queues.

The controller 130 is configured to process the memory request is processed in response to the representation of the memory request being dequeued. In general, the memory request is dequeued when it is at the head of a queue of a present way and the way is not busy. If there are no more deferred requests for a way, and the way is not busy, the way is evicted and the request at the head of the cache set queue is taken to be processed. In an example, where the memory request is stored in a directory data structure, processing the memory request includes using the identifier of the entry from the dequeued representation of the memory request to retrieve the memory request from the directory data structure, and executing the memory request to update the cache line.

Figure 2:
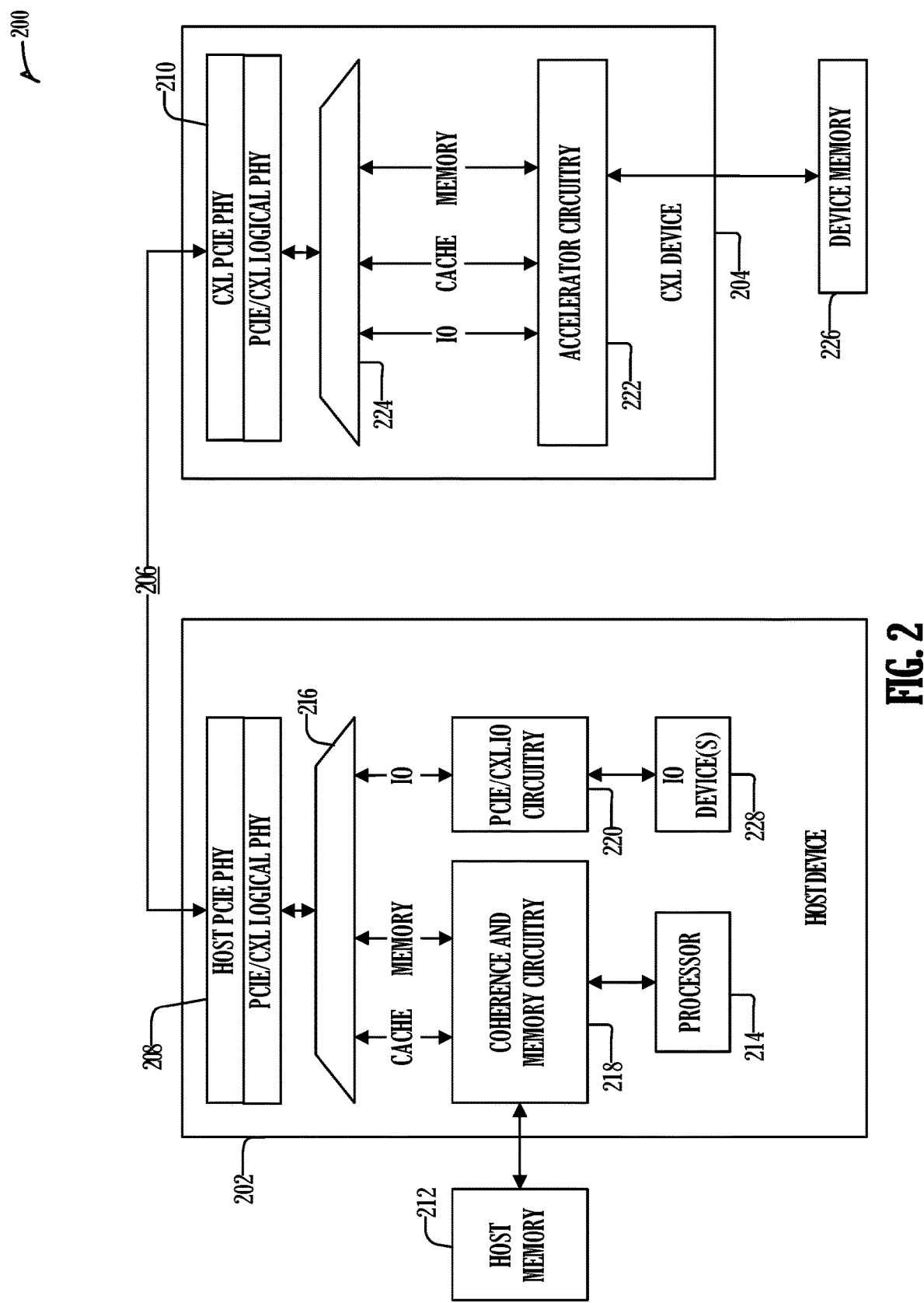
FIG. 2 illustrates an example of a host connected to a CXL device, according to an embodiment.

FIG. 2 illustrates an example of a host connected to a CXL device, according to an embodiment. FIG. 2 illustrates generally an example of a CXL system 200 that uses a CXL link 206 to connect a host device 202 and a CXL device 204 via a host physical layer PCIE interface 208 and a CXL client physical layer PCIE interface 210 respectively. In an example, the host device 202 comprises or corresponds to the host device 105 and the CXL device 204 comprises or corresponds to the memory system 125 from the example of the system in FIG. 1. A memory system command manager can comprise a portion of the host device 202 or the CXL device 204. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores) and IO device(s) 228. The host device 202 can comprise, or can be coupled to, host memory 212. The host device 202 can include various circuitry (e.g., logic) configured to facilitate CXL-based communications and transactions with the CXL device 204. For example, the host device 202 can include coherence and memory circuitry 218 configured to implement transactions according to CXL.cache and CXL.mem semantics, and the host device 202 can include PCIe circuitry 220 configured to implement transactions according to CXL.io semantics. In an example, the host device 202 can be configured to manage coherency of data cached at the CXL device 204 using, e.g., its coherence and memory circuitry 218.

The host device 202 can further include a host multiplexer 216 configured to modulate communications over the CXL link 206 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures can use different solutions, which in turn can compromise backward compatibility. CXL can address this problem by consolidating the coherency function at the host device 202, such as using the coherence and memory circuitry 218.

The CXL device 204 can include an accelerator device that comprises various accelerator circuitry 222. In an example, the CXL device 204 can comprise, or can be coupled to, CXL device memory 226. The CXL device 204 can include various circuitry configured to facilitate CXL-based communications and transactions with the host device 202 using the CXL link 206. For example, the accelerator circuitry 222 can be configured to implement transactions according to CXL.cache, CXL.mem, and CXL.io semantics. The CXL device 204 can include a CXL device multiplexer 224 configured to control communications over the CXL link 206. The accelerator circuitry 222 can be one or more processors that can perform one or more tasks. Accelerator circuitry 222 can be a general purpose processor or a processor designed to accelerate one or more specific workloads.

Figure 3:
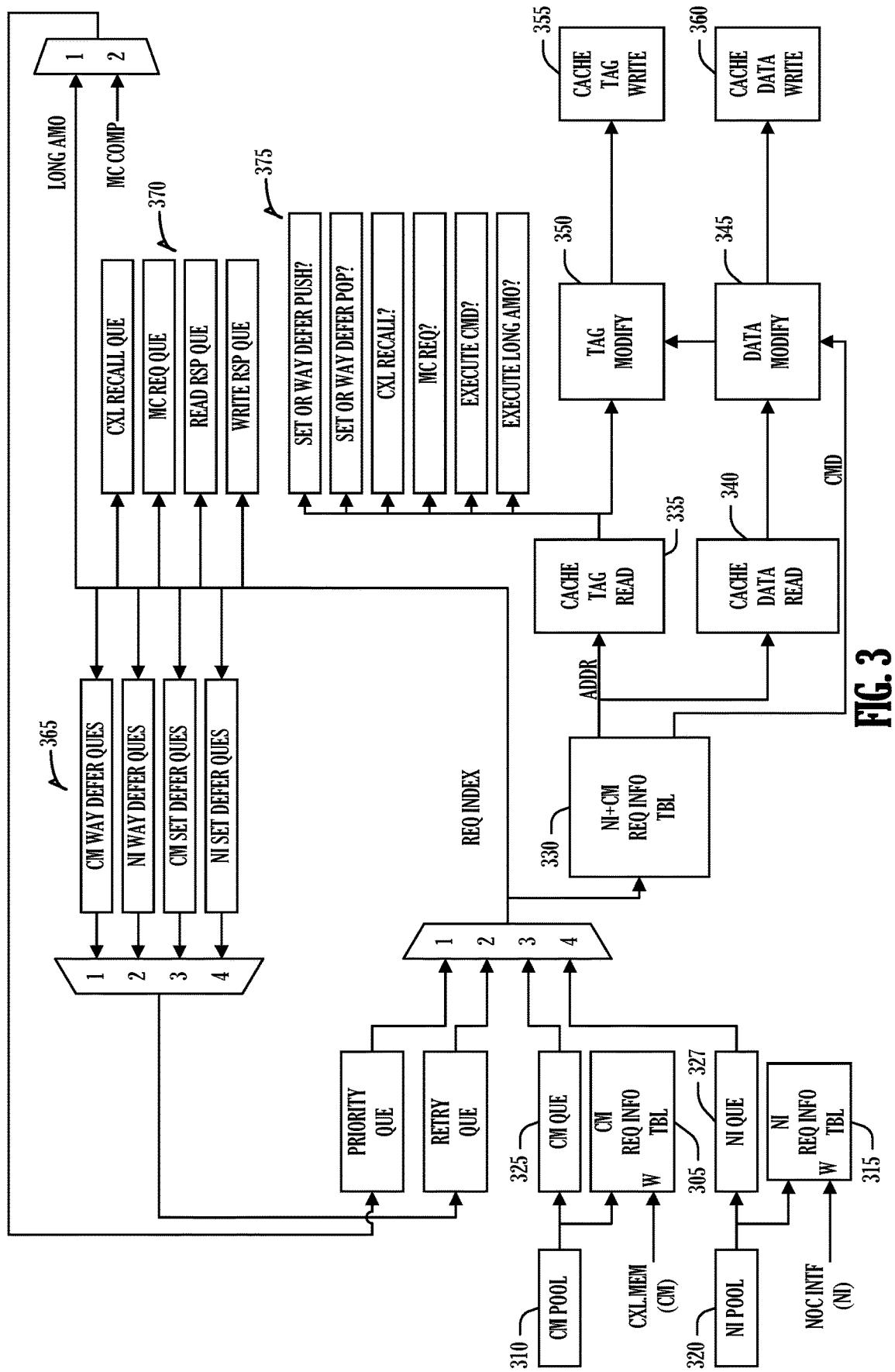
FIG. 3 illustrates example components of a memory device, according to an embodiment.

FIG. 3 illustrates example components of a memory device, according to an embodiment. The illustrated components are part of a memory controller, such as those described above (e.g., the memory controller 130 illustrated in FIG. 1) implementing a memory-side cache (MSC). The illustrated components include elements to address internal (e.g., from a near-memory accelerator) and external (e.g., received from a host via a CXL link) request differences used to maintain CXL protocol requirements, such as maintaining forward progress of CXL memory (CM) requests.

As illustrated, CM refers to CXL memory or other external requests and NI refers to requests coming from a NOC interface or other internal requests. Requests from CXL.mem are written to the CM Request Information Table 305. The entry in the CM Request Information Table 305 to which a request is written is obtained from the CM Request Information Table Pool 310. The CM Request Information Table Pool 310 maintains a list of indices to CM Request Information Table entries that are available (e.g., free, or unused). Requests from an accelerator within the device are written to the NI Request Information Table 315 using the NI Request Information Table Pool 320 for the available entry indices. The two pools the CM Request Information Table Pool 310 and the NI Request Information Table Pool 320 are configured such that accelerator requests (e.g., internal requests) cannot consume all table entries. Thus, for example, if an additional NI request arrives and there is no free entry indicated in the NI Request Information Table Pool 320, the request fails.

CXL.mem requests from the CM queue 325 are selected at higher priority than NI requests in the NI queue 327 to ensure forward progress of the CM requests. In an example, as illustrated, when a request is selected from either the CM queue 325 or the NI queue 327, the request information is written into the NI+CM Request Information Table 325. Hereafter, each request is represented in the carious queues by an identifier (e.g., index) to an entry of the NI+CM Request Information Table 330. This arrangement can reduce the storage requirements and bandwidth in transferring the request information among the various queues at different processing points in the controller. When an aspect of the request is needed by a processing point, such as an address for a read, the identifier is used to reference the entry in the NI+CM Request Information Table 330 and retrieve the field of the request corresponding to the needed aspect. As with the CM Request Information Table 305 and the NI Request Information Table 315, a free list, or pool, of entries can be used to quickly determine which entries are available to store request information in the NI+CM Request Information Table 330.

When a request is selected, a cache tag 335 for a cache line (e.g., cache way) corresponding to an address in the request is checked to determine whether the requests will be deferred (e.g., processed later). Deferral of the request is generally required when there is no free way line entry in a cache set for the address in the request. If no deferral will occur, the cache data can be read 340 or modified 345 (e.g., for a write), and the way tag can be modified 350. Modifying the tag 350 or the cache data 345 can respectively be written to backing memory, such as in writing the tag data 355 and the cache way data 360.

When the request is deferred, the request the request entry identifier (e.g., from the NI+CM Request Information Table 330) is pushed to either the CM or NI defer queues 365. The way defer queues 365 are used when there is a way corresponding to the address in the request but the way is busy (e.g., waiting for another command to complete). The set defer queues 365 are used when there is no way that corresponds to the address. The request remains queued until a way is available (e.g., not busy). In an example, there are separate CM and NI defer queues 365 for each cache set within the cache.

The external control queues 370 manage external responses to the cache, such as responses to reads or writes to the backing memory, memory controller (MC) requests, or CXL recalls. A CXL recall is a request by the memory device to regain control of a cache way from the host. The recall is requested of the host and the host communicates the control of the cache way to the memory controller, for example, in CXL meta state. This procedure can be called a bias flip as the control bias for the cache way is flipped from the host to the controller or vice versa. This technique is used to enable cache coherency between any host cache and the memory device.

The command queues 375 track requests through a variety of processing points, such as whether to push or pop requests from defer queues 365, whether a CXL recall is initiated, memory controller requests, executing a command, or executing an atomic memory operation (AMO). The reference to a long AMO is an AMO that cannot complete within a single execution cycle (e.g., a clock cycle). An AMO is a near-memory operation completed by an accelerator of the memory controller.

The illustrated control and data paths are configured such that separate storage, queuing, and request prioritization enables forward progress on CM requests while executing in the presence of NI requests. Thus, CM requests will not be delayed by an NI request.

FIG. 4 illustrates an example of an associative cache 400, according to an embodiment. Here, the associative cache 400 includes four cache sets, cache set zero 405, cache set one 410, cache set two 415, and cache set three 420. Note that each cache set corresponds to a memory address range. Thus, cache set one corresponds to all memory elements with an address prefixed by 00 while cache set three 415 corresponds to all memory elements with an address prefixed by 10. The cache lines within each cache set represent a storage element (e.g., register) sized for an element in the memory. Each cache line can also be called a "way." Thus, as illustrated, the associated cache 400 is a four-way associative cache because four ways can be used for each cache set. Generally, memory requests with addresses in one cache set will load a way until all of the ways are used. With the arrival of another memory request, a process to evict a way to load the new data can be undertaken to free the way for the new memory request.

The associative cache 400 can maintain metadata for the ways. Thus, as illustrated, the associative cache 400 includes a tag (e.g., metadata) in addition to the way data, resulting in the way zero tag and data 425, the way one tag and data 430, the way two tag and data 435, and the way three tag and data 440. Examples of tag data can include a dirty bit to indicate whether the way is out-of-sync with the backing memory, whether there is an operation to synchronize the way with host memory (e.g., a host recall is underway), or CXL meta-state, request state, among others. In an example, whether the source (e.g., internal, or external) of the request impacts operation of the memory controller, the tag data can include designation of whether the request is internal or external as well as, for example, whether the request is internal and deferred, or external and deferred.

The following is an example of a data structure (e.g., C-style struct) to hold tag data that applies to an entire cache set (e.g., not specific to a single way in the cache set):

```
struct MscSet {
    bool            m_bRetryPend;
    uint32_t        m_evHashMask;
    SimCount        m_evRecallCnt;
    SimMscReqList   m_niDeferList;
    SimMscReqList   m_cmDeferList;
};
```

The following is an example of a data structure (e.g., C-style struct) to hold tag data for a given way in a cache set:

```
struct Msc Way {
    struct Msc WayTag {
        uint64_t        m_addr;
        std::bitset     m_validMask;
        std::bitset     m_dirtyMask;
        std::bitset     m_mBusyMask;
        bool            m_bRetryPend;
        bool            m_bRecallPend;
        uint16_t        m_recallRid;
        MetaState       m_memMetaState;
        MetaState       m_curMetaState;
        SimMscReqList   m_niDeferList;
        SimMscReqList   m_cmDeferList;
    } m_tag;
    uint8_t[64]     m_data;
};
```

Figure 5:
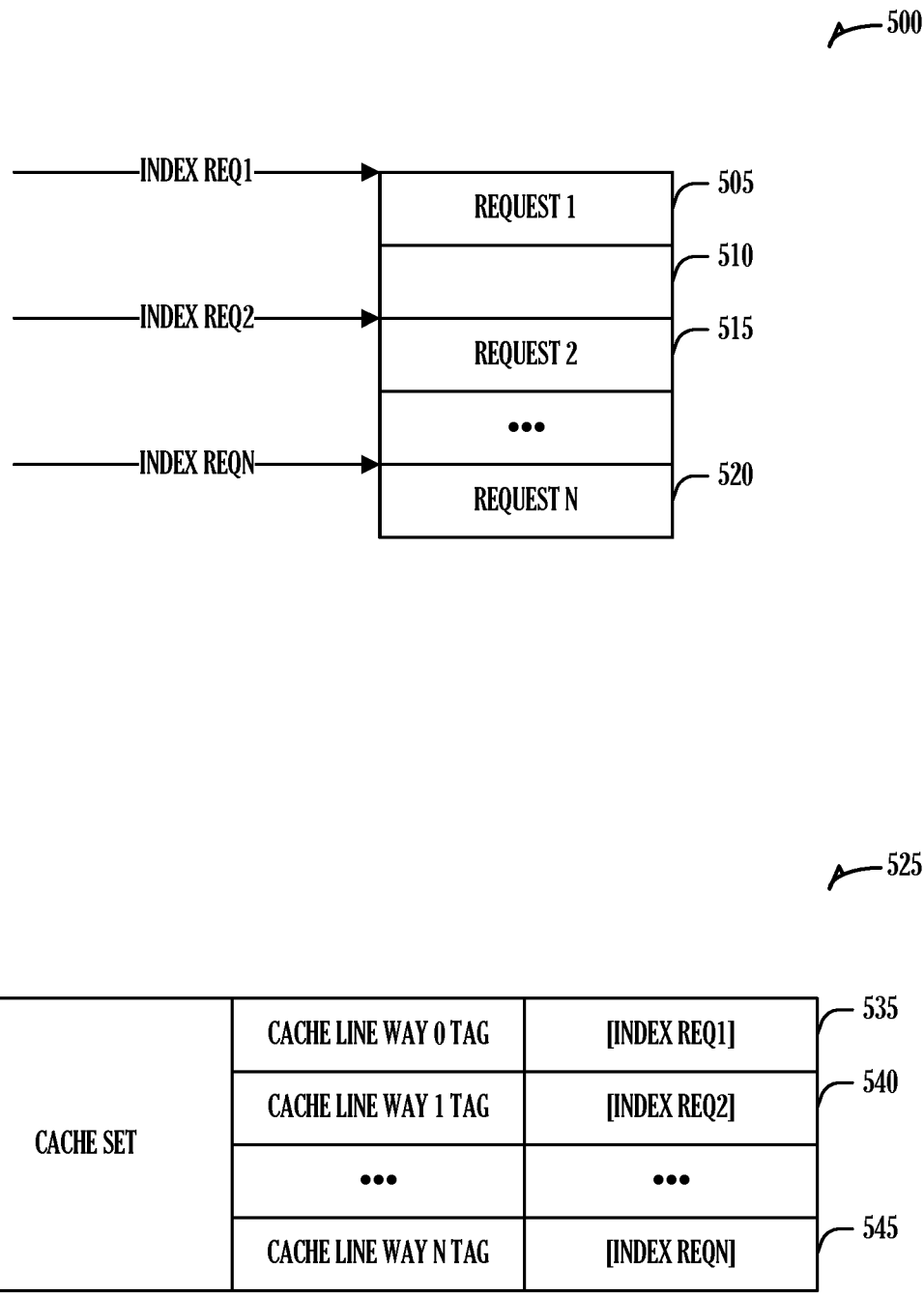
FIG. 5 illustrates an example of a memory including several cache way defer queues and cache tags pointing to the defer queues, according to an embodiment.

FIG. 5 illustrates an example of a memory 500 including several cache way defer queues and cache tags 525 pointing to the defer queues, according to an embodiment. As illustrated, the memory 500 is used to implement several queues. The queues each occupy a contiguous range of the memory 500, with the specific boundaries of the queue defined by a head a tail pointer. In this example, the queue is implemented as a linked list or a double-linked list. The former enables traversal starting at the head, although enqueueing can be accomplished merely by updating the tail element with a new tail location and placing the new item at the new tail location. A double linked list enables traversal of the list from either the head or the tail.

The queues correspond to a cache way by storage of the head and tail pointers in the tag data. Thus, in the cache set 530, the way zero tag 535 maintains the head and tail pointer for the queue 505 (illustrated as holding request one). The empty entry 510 is part of the contiguous memory range corresponding to the queue 505. Thus, if a second request were enqueue, the tail pointer would be moved to the entry 510. Similarly, the way one tag 540 holds the head and tail pointer for the queue 515, and the way N tag 545 maintains the head and tail pointer for the queue 520.

An alternative configuration of the queue can leverage, if it exists, the request directory entries (e.g., as illustrated in element 330 of FIG. 3). Here, the queue is simply a head pointer into the directory to designate the first request in the queue and a tail pointer into the directory to designate the last request in the queue. The queue, in this example, is a linked-list in which the elements (e.g., directory entries for the requests) point to each other. In a simple implementation, the links are one-way from the head to the tail. Thus, the directory entry for each element in the list links to the next element in the list. To add a new element, the "next element" pointer in the directory entry indicated by the tail pointer is updated to the new entry and the tail pointer is also updated to the new entry. In an example, the linked list can be bi-directional, in which each directory entry has a pointer to a previous element as well as a next element. The queue is traversed by entering the queue using the head pointer, for example, to get to a directory entry. The next element pointer can then be used to get to the next element of the queue. This process can be repeated until the next element pointer is empty, indicating the end of the queue.

FIG. 6 illustrates an example of tag pointers to request queues, according to an embodiment. FIG. 6 provides an alternative representation for much of what is illustrated in FIG. 5. As illustrated, the common tag 605 includes meta data for the cache set that is not specific to a given way, whereas the way tags hold meta data for the current ways. The various tags hold head and tail pointers to the external interface (illustrated as host) queues and the internal interface (illustrated as UAE) queues. Here, the cache set external queue 610 has two entries and the cache set internal queue is empty. The queues for way zero are empty, way one has two entries in each of the way one external queue 615 and the way one internal queue 620, way two has a single entry in the way two internal queue 625 and no entries in the way two external queue, and way three has three entries in the way three internal queue and no entries in the way three external queue.

In operation, each of the set-associative ways has its own unique set of tag bits. Included in these bits are linked list head and tail pointers along with empty bits that indicate if any requests are valid in the linked list. A set of linked list head and tail pointers, along with an empty bit, are also maintained in the common tag 605 bits. Again, the common tag 605 bits not associated with one of the set-associative ways of that cache-set.

Figure 7:
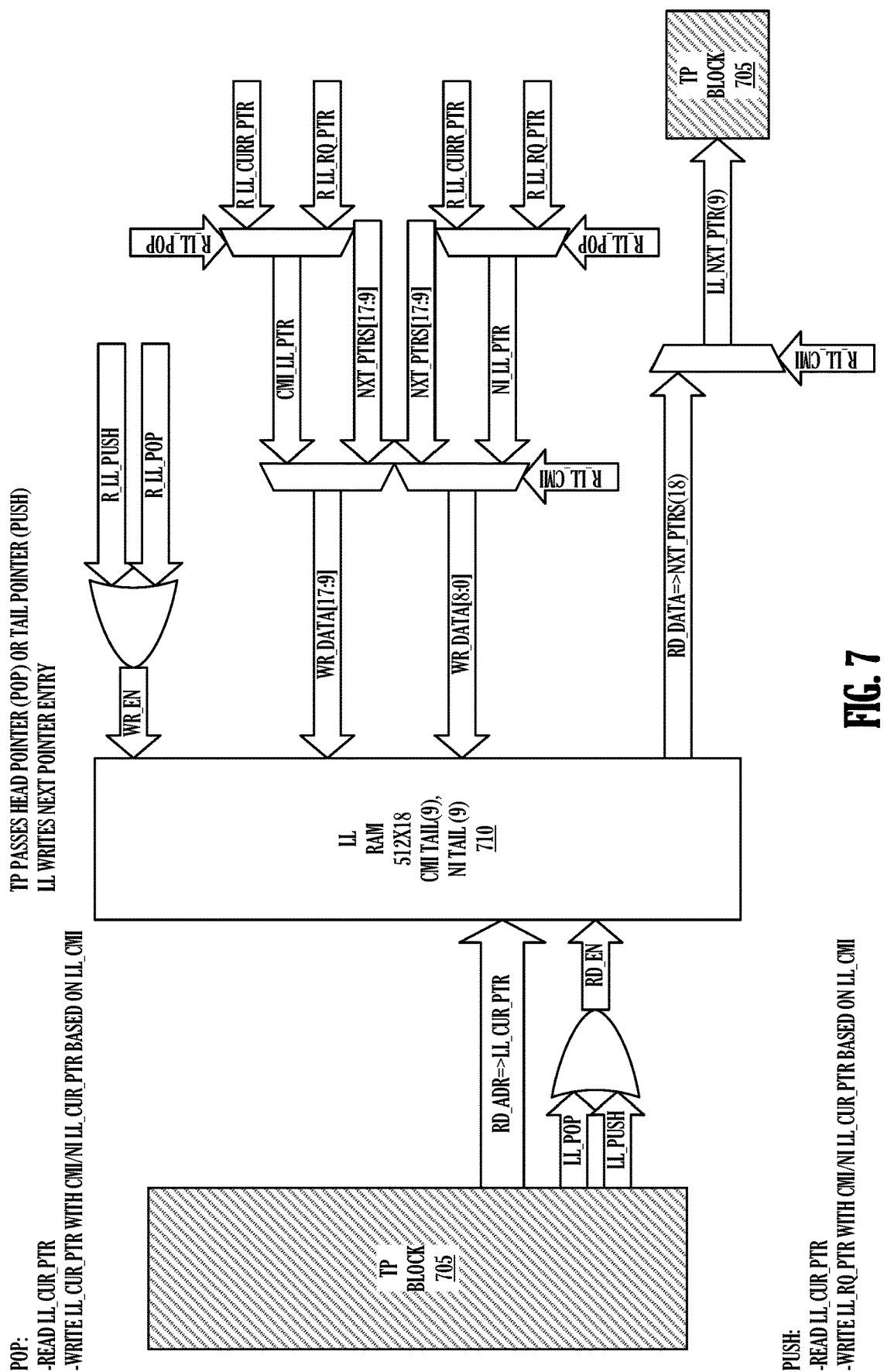
FIG. 7 illustrates an example of circuitry to implement linked lists for defer queues, according to an embodiment.

Outside of the tags is a linked list storage ram. Along with circuitry that enables popping the head of a linked list or pushing onto the tail of a linked list. FIG. 7 illustrates an example of this arrangement. In an example, the entries in any given linked list contain pointers to directory-based storage RAMs. These entries, as noted above, can contain all information related to the original request, such as address, data, opcode, transaction identifier, size, etc. In an example, the depth of the directory-based storage is the same as the depth of the linked list storage. This ensures that there is always a linked list entry for any request held in the directory-based storage.

In an example, as a cache arbiter pops requests from one of the input queues to the cache, the cache set for the request is read from the tag-cache. The read tag value can contain tag-addresses that are then compared to the request address bits to determine if the request hits one of the present ways of the cache set. If the request hits, circuitry determines if the line is ready to process this new request. If not then the request is pushed onto the hit way's linked list.

If the request misses, and there isn't an available way to fill for this new request, the request is pushed onto the common tag linked list. Subsequently, as prior requests are retired (e.g., completed), the cache-index's tags are examined to determine if there are any pending linked list requests.

The following order can be used to process deferred requests. First, the retiring request's way lists are examined. If that way's linked lists are empty, then the common tag's linked lists are examined. If the retiring request's way has a non-empty linked list, then that list is popped and the request at the head of that linked list is retried. If the retiring request's way is empty, but the common tag's linked list isn't empty, then the common tag's linked list is popped. If both linked lists are empty, then this cache-index will remain idle until either another input queue request accesses it, or one of the other set-associative ways has a prior request retire, which will cause that way's linked list to be examined.

The following are examples of set-associative tag (e.g., way tag) bits that can be used:

| Field Name | bits | Field LSB | Description |
|---|---|---|---|
| clempty | 1 | 38 | CMI list empty - implies CMI linked list head and tail pointers are valid (when 0) |
| chdptr | 9 | 29 | CMI head pointer - pointer to head of way's CMI linked list, valid if clempty == 0 |
| ctlptr | 9 | 20 | CMI tail pointer - pointer to the tail of way's CMI linked list, valid if clempty == 0 |
| nlempty | 1 | 19 | NI list empty - implies NI linked list head and tail pointers are valid (when 0) |
| nhdptr | 9 | 10 | NI head pointer - pointer to head of way's NI linked list, valid if nlempty == 0 |
| ntlptr | 9 | 1 | NI tail pointer - pointer to the tail of way's NI linked list, valid if nlempty == 0 |

The following are examples of common tag (e.g., cache set tag) bits that can be used:

| Field Name | bits | Field LSB | Description |
|---|---|---|---|
| dclempty | 1 | 38 | Deferred retry pending - set on a pop of the deferred list; cleared by TP (tag processor) when deferred retry is processed |
| dchdptr | 9 | 29 | Deferred CMI list empty - implies deferred CMI linked list head and tail pointers are valid (when 0) |
| dctlptr | 9 | 20 | Deferred CMI head pointer - pointer to head of deferred CMI linked list, valid if dclempty == 0 |
| dnlempty | 1 | 19 | Deferred CMI tail pointer - pointer to the tail of deferred CMI linked list, valid if dclempty == 0 |
| dnhdptr | 9 | 10 | Deferred NI list empty - implies deferred NI linked list head and tail pointers are valid (when 0) |

-continued

| Field Name | Field bits | Field LSB | Description |
|---|---|---|---|
| dntlptr | 9 | 1 | Deferred NI head pointer - pointer to head of deferred NI linked list, valid if dnlempty == 0 |

The following is an example of linked list (queue) popping priority:

| recall_pend (from hit-way) | CMI LL (from hit-way) | NI LL (from hit-way) | Deferred CMI LL | Deferred NI LL | Priority (highest to lowest) |
|---|---|---|---|---|---|
| x | !empty | x | x | x | CMI LL |
| 0 | empty | !empty | x | x | NI LL |
| x | empty | empty | !empty | x | Deferred CMI LL (1) |
| x | empty | empty | empty | !empty | Deferred NI LL (1) |

In an example, with respect to the entries marked with "(1)", the deferred linked list is not popped if either the deferred retry_pend or evict_pend tag bits are already set. The entries marked with "x" means that the value of the entry is irrelevant.

The following are examples of tag update events:

| Field Name | Update Event |
|---|---|
| clempty | Cleared when a CMI request is pushed on an empty CMI linked list. Set when the last entry from the CMI linked list is popped. |
| chdptr | Updated when a CMI request is pushed on an empty CMI linked list, or when the head of the CMI linked list is popped. |
| ctlptr | Updated when a CMI request is pushed onto the CMI linked list. |
| nlempty | Cleared when a NI request is pushed on an empty NI linked list. Set when the last entry from the NI linked list is popped. |
| nhdptr | Updated when a NI request is pushed on an empty NI linked list, or when the head of the NI linked list is popped. |
| ntlptr | Updated when a NI request is pushed onto the NI linked list. |
| dclempty | Cleared when a CMI request is pushed on an empty deferred CMI linked list. Set when the last entry from the deferred CMI linked list is popped. |
| dchdptr | Updated when a CMI request is pushed on an empty deferred CMI linked list, or when the head of the deferred CMI linked list is popped. |
| dctlptr | Updated when a CMI request is pushed onto the deferred CMI linked list. |
| dnlempty | Cleared when a NI request is pushed on an empty deferred NI linked list. Set when the last entry from the deferred NI linked list is popped. |
| dnhdptr | Updated when a NI request is pushed on an empty deferred NI linked list, or when the head of the deferred NI linked list is popped |
| dntlptr | Updated when a NI request is pushed onto the deferred NI linked list. |

FIG. 7 illustrates an example of circuitry to implement linked lists for defer queues, according to an embodiment. The transaction processing circuitry, or TP block 705 is connected to the linked list RAM (LL RAM 710) in the manner illustrated. The following abbreviations are used in the illustration:

CMI: CXL memory interface (also referred to an external interface)
Curr: current
EN: enable
LL: linked list
NI: Network-on-Chip (NOC) interface (also referred to an internal interface)
NXT: next
PTR: pointer
RD: read
R_LL: read linked list
RQ: request
WR: write Also, in accordance with queue nomenclature, to pop is to remove the element at the head of a linked list and to push to put an element at the tail of the linked list.

Figure 8:
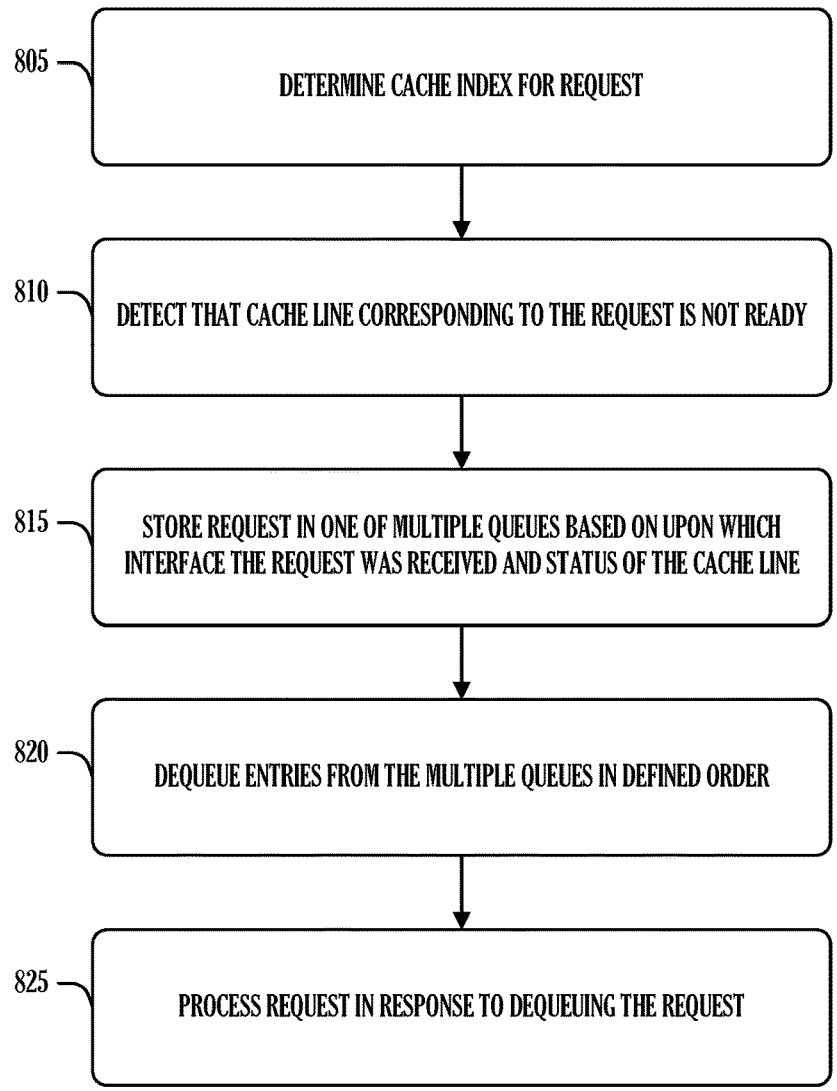
FIG. 8 illustrates a flow diagram of an example of a method for memory side cache request handling, according to an embodiment.

FIG. 8 illustrates a flow diagram of an example of a method 800 for memory side cache request handling, according to an embodiment. The operations of the method 800 are performed by computational hardware, such as that described above or below (e.g., processing circuitry).

At operation 805, a cache set for a memory request is determined. Here, the cache set has multiple ways with each way corresponding to a cache line.

At operation 810, a detection is performed to determine that a way of the multiple ways is not ready for the memory request. In an example, where the memory request is stored in a directory data structure, detecting that the way is not ready for the memory request includes using the identifier of the entry to retrieve an address from the memory request, locating the way based on the address, and determining that the way is busy or a queue corresponding to the way is not empty. In an example, detecting that the way is not ready for the memory request includes using the identifier of the entry to retrieve an address from the memory request, and determining that there is no way corresponding to the address the way based on the address.

At operation 815, the memory request is stored in a queue of multiple queues based on an interface upon which the memory request was received and the present (e.g., current) ways of the cache set. In an example, the multiple queues include a queue that does not correspond to a present way of the cache line, called a common tag for the cache line. In an example, the multiple queues include a queue in each way and the common tag for each interface of a memory device. In an example, each queue of the multiple queues is a linked list. In an example, a head and tail pointer is stored for each list in the common tag or a tag corresponding to a way to which the queue corresponds.

In an example, a directory can be used to store memory request information to avoid transferring the complete memory request data between queues. Here, an identifier of which entry in the directory that holds the memory request is used in the various queues. Thus, in an example, the method 800 can include the operations of receiving the memory request and writing the memory request into an entry of the directory data structure. Here, the entry includes an identifier of the entry. In this example, the storing the memory request in the queue includes using the identifier of the entry as a representation of the memory request in the queue.

At operation 820, entries from the multiple queues are dequeued in a defined order to determine a next memory request to process. Here, the defined order gives priority to memory requests that match a present way over memory requests that do not match a present way. Then, the defined order gives priority to memory requests from an external interface over memory requests from an internal interface.

In an example, the defined order dequeues entries from queues corresponding to an external interface to the memory device and a present way of the cache line before queues corresponding to an internal interface to the memory device and a present way. Then the defined order dequeues entries from the queues corresponding to the internal interface to the memory device and a present way before queues corresponding to the external interface and the common tag. Next, defined order dequeues entries from the queues corresponding to the external interface and the common tag before queues corresponding to the internal interface and the common tag.

At operation 825, the memory request is processed in response to the representation of the memory request being dequeued. In an example, where the memory request is stored in a directory data structure, processing the memory request includes using the identifier of the entry from the dequeued representation of the memory request to retrieve the memory request from the directory data structure, and executing the memory request to update the cache line.

Figure 9:
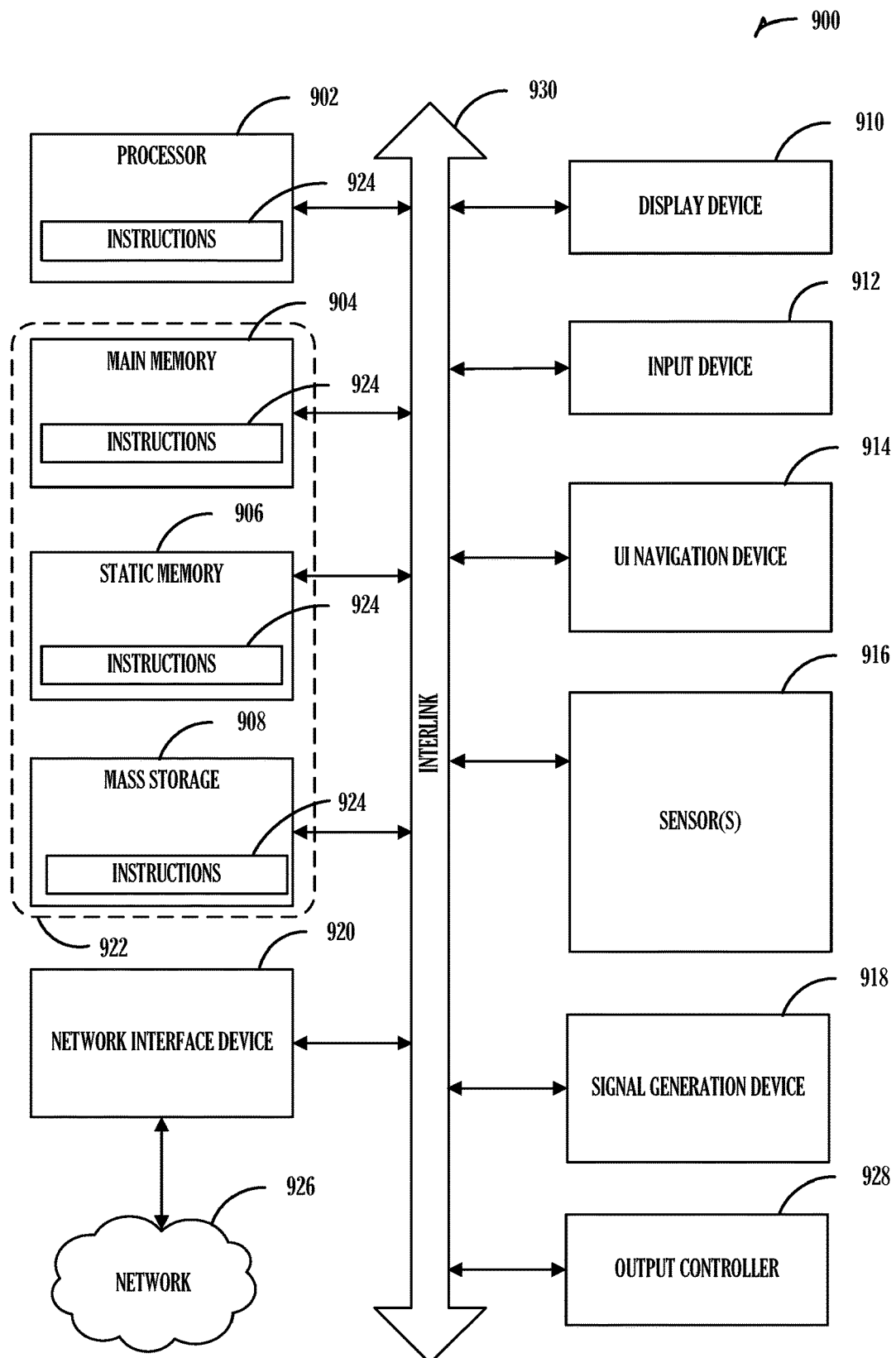
FIG. 9 illustrates an example of a machine with which one or more embodiments can be implemented.

FIG. 9 illustrates a block diagram of an example machine 900 with which any one or more of the techniques (e.g., methodologies) discussed herein can perform. Examples, as described herein, can include, or can operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 can include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drives, tape drives, flash storage, or other block devices) some or all of which can communicate with each other via an interlink (e.g., bus) 930. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 can be, or include, a machine readable medium 922 on which is stored one or more sets of data structures or instructions 924 (e.g., software) embodying or utilized by any one or more of the techniques or functions described herein. The instructions 924 can also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 can constitute the machine readable media 922. While the machine readable medium 922 is illustrated as a single medium, the term "machine readable medium" can include a single medium or multiple media (e.g., a centralized or distributed database, or associated caches and servers) configured to store the one or more instructions 924.

The term "machine readable medium" can include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 922 can be representative of the instructions 924, such as instructions 924 themselves or a format from which the instructions 924 can be derived. This format from which the instructions 924 can be derived can include source code, encoded instructions (e.g., in compressed or encrypted form), packaged instructions (e.g., split into multiple packages), or the like. The information representative of the instructions 924 in the machine readable medium 922 can be processed by processing circuitry into the instructions to implement any of the operations discussed herein. For example, deriving the instructions 924 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 924.

In an example, the derivation of the instructions 924 can include assembly, compilation, or interpretation of the information (e.g., by the processing circuitry) to create the instructions 924 from some intermediate or preprocessed format provided by the machine readable medium 922. The information, when provided in multiple parts, can be combined, unpacked, and modified to create the instructions 924. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 924 can be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

ADDITIONAL NOTES & EXAMPLES

Example 1 is an apparatus for memory side cache request handling, the apparatus comprising: a set of interfaces from which to received memory requests; a cache with a cache set; and processing circuitry configured to: determine the cache set for a memory request received via an interface from the set of interfaces, the cache set having multiple ways, each way corresponding to a cache line; detect that a way of the multiple ways is not ready for the memory request; store a representation of the memory request in a queue of multiple queues based on: the interface upon which the memory request was received; and present ways of the cache set; dequeue entries from the multiple queues in a defined order to determine a next memory request to process, the defined order giving priority to memory requests that match a present way over memory requests that do not match a present way, and the defined order giving priority to memory requests from an external interface over memory requests from an internal interface; and process the memory request in response to the representation of the memory request being dequeued.

In Example 2, the subject matter of Example 1, wherein the processing circuitry is configured to: receiving the memory request; and write the memory request into an entry of a directory data structure, the entry including an identifier of the entry, wherein storing the memory request in the queue includes using the identifier of the entry as the representation of the memory request in the queue.

In Example 3, the subject matter of Example 2, wherein, to detect that the way is not ready for the memory request, The processing circuitry is configured to: use the identifier of the entry to retrieve an address from the memory request; locate the way based on the address; and determine that the way is busy or a queue corresponding to the way is not empty.

In Example 4, the subject matter of any of Examples 2-3, wherein, to detect that the way is not ready for the memory request, the processing circuitry is configured to: use the identifier of the entry to retrieve an address from the memory request; and determine that there is no way corresponding to the address the way based on the address.

In Example 5, the subject matter of any of Examples 2-4, wherein, to process the memory request, the processing circuitry is configured to: use the identifier of the entry from the representation of the memory request that is dequeued to retrieve the memory request from the directory data structure; and execute the memory request to update the cache line.

In Example 6, the subject matter of any of Examples 1-5, wherein the multiple queues include a queue for each way of the cache line.

In Example 7, the subject matter of Example 6, wherein the multiple queues include a queue that does not correspond to a present way of the cache line, called a common tag for the cache line.

In Example 8, the subject matter of Example 7, wherein the multiple queues include a queue in each way and the common tag for each interface of a memory device.

In Example 9, the subject matter of Example 8, wherein the defined order dequeues entries from: queues corresponding to an external interface to the memory device and a present way of the cache line before queues corresponding to an internal interface to the memory device and a present way; from the queues corresponding to the internal interface to the memory device and a present way before queues corresponding to the external interface and the common tag; and from the queues corresponding to the external interface and the common tag before queues corresponding to the internal interface and the common tag.

In Example 10, the subject matter of any of Examples 8-9, wherein each queue is a linked list, and wherein a head and tail pointer is stored for each list in the common tag or a tag corresponding to a way to which the queue corresponds.

Example 11 is a method for memory side cache request handling, the method comprising: determining a cache set for a memory request, the cache set having multiple ways, each way corresponding to a cache line; detecting that a way of the multiple ways is not ready for the memory request; storing a representation of the memory request in a queue of multiple queues based on: an interface upon which the memory request was received; and present ways of the cache set; dequeuing entries from the multiple queues in a defined order to determine a next memory request to process, the defined order giving priority to memory requests that match a present way over memory requests that do not match a present way, and the defined order giving priority to memory requests from an external interface over memory requests from an internal interface; and processing the memory request in response to the representation of the memory request being dequeued.

In Example 12, the subject matter of Example 11, comprising: receiving the memory request; and writing the memory request into an entry of a directory data structure, the entry including an identifier of the entry, wherein storing the memory request in the queue includes using the identifier of the entry as the representation of the memory request in the queue.

In Example 13, the subject matter of Example 12, wherein detecting that the way is not ready for the memory request includes: using the identifier of the entry to retrieve an address from the memory request; locating the way based on the address; and determining that the way is busy or a queue corresponding to the way is not empty.

In Example 14, the subject matter of any of Examples 12-13, wherein detecting that the way is not ready for the memory request includes: using the identifier of the entry to retrieve an address from the memory request; and determining that there is no way corresponding to the address the way based on the address.

In Example 15, the subject matter of any of Examples 12-14, wherein processing the memory request includes: using the identifier of the entry from the representation of the memory request that is dequeued to retrieve the memory request from the directory data structure; and executing the memory request to update the cache line.

In Example 16, the subject matter of any of Examples 11-15, wherein the multiple queues include a queue for each way of the cache line.

In Example 17, the subject matter of Example 16, wherein the multiple queues include a queue that does not correspond to a present way of the cache line, called a common tag for the cache line.

In Example 18, the subject matter of Example 17, wherein the multiple queues include a queue in each way and the common tag for each interface of a memory device.

In Example 19, the subject matter of Example 18, wherein the defined order dequeues entries from: queues corresponding to an external interface to the memory device and a present way of the cache line before queues corresponding to an internal interface to the memory device and a present way; from the queues corresponding to the internal interface to the memory device and a present way before queues corresponding to the external interface and the common tag; and from the queues corresponding to the external interface and the common tag before queues corresponding to the internal interface and the common tag.

In Example 20, the subject matter of any of Examples 18-19, wherein each queue is a linked list, and wherein a head and tail pointer is stored for each list in the common tag or a tag corresponding to a way to which the queue corresponds.

Example 21 is a machine readable medium including instructions for memory side cache request handling, the instructions, when executed by processing circuitry, cause the processing circuitry to perform operations comprising: determining a cache set for a memory request, the cache set having multiple ways, each way corresponding to a cache line; detecting that a way of the multiple ways is not ready for the memory request; storing a representation of the memory request in a queue of multiple queues based on: an interface upon which the memory request was received; and present ways of the cache set; dequeuing entries from the multiple queues in a defined order to determine a next memory request to process, the defined order giving priority to memory requests that match a present way over memory requests that do not match a present way, and the defined order giving priority to memory requests from an external interface over memory requests from an internal interface; and processing the memory request in response to the representation of the memory request being dequeued.

In Example 22, the subject matter of Example 21, wherein the operations comprise: receiving the memory request; and writing the memory request into an entry of a directory data structure, the entry including an identifier of the entry, wherein storing the memory request in the queue includes using the identifier of the entry as the representation of the memory request in the queue.

In Example 23, the subject matter of Example 22, wherein detecting that the way is not ready for the memory request includes: using the identifier of the entry to retrieve an address from the memory request; locating the way based on the address; and determining that the way is busy or a queue corresponding to the way is not empty.

In Example 24, the subject matter of any of Examples 22-23, wherein detecting that the way is not ready for the memory request includes: using the identifier of the entry to retrieve an address from the memory request; and determining that there is no way corresponding to the address the way based on the address.

In Example 25, the subject matter of any of Examples 22-24, wherein processing the memory request includes: using the identifier of the entry from the representation of the memory request that is dequeued to retrieve the memory request from the directory data structure; and executing the memory request to update the cache line.

In Example 26, the subject matter of any of Examples 21-25, wherein the multiple queues include a queue for each way of the cache line.

In Example 27, the subject matter of Example 26, wherein the multiple queues include a queue that does not correspond to a present way of the cache line, called a common tag for the cache line.

In Example 28, the subject matter of Example 27, wherein the multiple queues include a queue in each way and the common tag for each interface of a memory device.

In Example 29, the subject matter of Example 28, wherein the defined order dequeues entries from: queues corresponding to an external interface to the memory device and a present way of the cache line before queues corresponding to an internal interface to the memory device and a present way; from the queues corresponding to the internal interface to the memory device and a present way before queues corresponding to the external interface and the common tag; and from the queues corresponding to the external interface and the common tag before queues corresponding to the internal interface and the common tag.

In Example 30, the subject matter of any of Examples 28-29, wherein each queue is a linked list, and wherein a head and tail pointer is stored for each list in the common tag or a tag corresponding to a way to which the queue corresponds.

Example 31 is a system for memory side cache request handling, the system comprising: means for determining a cache set for a memory request, the cache set having multiple ways, each way corresponding to a cache line; means for detecting that a way of the multiple ways is not ready for the memory request; means for storing a representation of the memory request in a queue of multiple queues based on: an interface upon which the memory request was received; and present ways of the cache set; means for dequeuing entries from the multiple queues in a defined order to determine a next memory request to process, the defined order giving priority to memory requests that match a present way over memory requests that do not match a present way, and the defined order giving priority to memory requests from an external interface over memory requests from an internal interface; and means for processing the memory request in response to the representation of the memory request being dequeued.

In Example 32, the subject matter of Example 31, comprising: means for receiving the memory request; and means for writing the memory request into an entry of a directory data structure, the entry including an identifier of the entry, wherein storing the memory request in the queue includes using the identifier of the entry as the representation of the memory request in the queue.

In Example 33, the subject matter of Example 32, wherein the means for detecting that the way is not ready for the memory request include: means for using the identifier of the entry to retrieve an address from the memory request; means for locating the way based on the address; and means for determining that the way is busy or a queue corresponding to the way is not empty.

In Example 34, the subject matter of any of Examples 32-33, wherein the means for detecting that the way is not ready for the memory request include: means for using the identifier of the entry to retrieve an address from the memory request; and means for determining that there is no way corresponding to the address the way based on the address.

In Example 35, the subject matter of any of Examples 32-34, wherein the means for processing the memory request include: means for using the identifier of the entry from the representation of the memory request that is dequeued to retrieve the memory request from the directory data structure; and means for executing the memory request to update the cache line.

In Example 36, the subject matter of any of Examples 31-35, wherein the multiple queues include a queue for each way of the cache line.

In Example 37, the subject matter of Example 36, wherein the multiple queues include a queue that does not correspond to a present way of the cache line, called a common tag for the cache line.

In Example 38, the subject matter of Example 37, wherein the multiple queues include a queue in each way and the common tag for each interface of a memory device.

In Example 39, the subject matter of Example 38, wherein the defined order dequeues entries from: queues corresponding to an external interface to the memory device and a present way of the cache line before queues corresponding to an internal interface to the memory device and a present way; from the queues corresponding to the internal interface to the memory device and a present way before queues corresponding to the external interface and the common tag; and from the queues corresponding to the external interface and the common tag before queues corresponding to the internal interface and the common tag.

In Example 40, the subject matter of any of Examples 38-39, wherein each queue is a linked list, and wherein a head and tail pointer is stored for each list in the common tag or a tag corresponding to a way to which the queue corresponds.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to enable the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus comprising:
   a set of interfaces from which to received memory requests;
   a cache with a cache set; and
   processing circuitry configured to:
      determine the cache set for a memory request received via an interface from the set of interfaces, the cache set having multiple ways, each way corresponding to a cache line;
      detect that a way of the multiple ways is not ready for the memory request;
      store a representation of the memory request in a queue of multiple queues based on:
         the interface upon which the memory request was received; and
         present ways of the cache set;
      dequeue entries from the multiple queues in a defined order to determine a next memory request to process, the defined order giving priority to memory requests that match a present way over memory requests that do not match a present way, and the defined order giving priority to memory requests from an external interface over memory requests from an internal interface; and
      process the memory request in response to the representation of the memory request being dequeued.

2. The apparatus of claim 1, wherein the processing circuitry is configured to:
   receiving the memory request; and
   write the memory request into an entry of a directory data structure, the entry including an identifier of the entry, wherein storing the memory request in the queue includes using the identifier of the entry as the representation of the memory request in the queue.

3. The apparatus of claim 2, wherein, to process the memory request, the processing circuitry is configured to:
   use the identifier of the entry from the representation of the memory request that is dequeued to retrieve the memory request from the directory data structure; and
   execute the memory request to update the cache line.

4. The apparatus of claim 1, wherein the multiple queues include a queue for each way of the cache line.

5. The apparatus of claim 4, wherein the multiple queues include a queue that does not correspond to a present way of the cache line, called a common tag for the cache line.

6. The apparatus of claim 5, wherein the multiple queues include a queue in each way and the common tag for each interface of a memory device.

7. The apparatus of claim 6, wherein the defined order dequeues entries from:
   queues corresponding to an external interface to the memory device and a present way of the cache line before queues corresponding to an internal interface to the memory device and a present way; from the queues corresponding to the internal interface to the memory device and a present way before queues corresponding to the external interface and the common tag; and
   from the queues corresponding to the external interface and the common tag before queues corresponding to the internal interface and the common tag.

8. The apparatus of claim 6, wherein each queue is a linked list, and wherein a head and tail pointer is stored for each list in the common tag or a tag corresponding to a way to which the queue corresponds.

9. A method comprising:
   determining a cache set for a memory request, the cache set having multiple ways, each way corresponding to a cache line;
   detecting that a way of the multiple ways is not ready for the memory request;
   storing a representation of the memory request in a queue of multiple queues based on:
      an interface upon which the memory request was received; and
      present ways of the cache set;
   dequeuing entries from the multiple queues in a defined order to determine a next memory request to process, the defined order giving priority to memory requests that match a present way over memory requests that do not match a present way, and the defined order giving priority to memory requests from an external interface over memory requests from an internal interface; and
   processing the memory request in response to the representation of the memory request being dequeued.

10. The method of claim 9, comprising:
    receiving the memory request; and
    writing the memory request into an entry of a directory data structure, the entry including an identifier of the entry, wherein storing the memory request in the queue includes using the identifier of the entry as the representation of the memory request in the queue.

11. The method of claim 10, wherein processing the memory request includes:
    using the identifier of the entry from the representation of the memory request that is dequeued to retrieve the memory request from the directory data structure; and
    executing the memory request to update the cache line.

12. The method of claim 9, wherein the multiple queues include a queue for each way of the cache line.

13. The method of claim 12, wherein the multiple queues include a queue that does not correspond to a present way of the cache line, called a common tag for the cache line.

14. The method of claim 13, wherein the multiple queues include a queue in each way and the common tag for each interface of a memory device.

15. The method of claim 14, wherein the defined order dequeues entries from:
- queues corresponding to an external interface to the memory device and a present way of the cache line before queues corresponding to an internal interface to the memory device and a present way; from the queues corresponding to the internal interface to the memory device and a present way before queues corresponding to the external interface and the common tag; and
- from the queues corresponding to the external interface and the common tag before queues corresponding to the internal interface and the common tag.

16. The method of claim 14, wherein each queue is a linked list, and wherein a head and tail pointer is stored for each list in the common tag or a tag corresponding to a way to which the queue corresponds.

17. A non-transitory machine readable medium including that, when executed by processing circuitry, cause the processing circuitry to perform operations comprising:
- determining a cache set for a memory request, the cache set having multiple ways, each way corresponding to a cache line;
- detecting that a way of the multiple ways is not ready for the memory request;
- storing a representation of the memory request in a queue of multiple queues based on:
  - an interface upon which the memory request was received; and
  - present ways of the cache set;
- dequeuing entries from the multiple queues in a defined order to determine a next memory request to process, the defined order giving priority to memory requests that match a present way over memory requests that do not match a present way, and the defined order giving priority to memory requests from an external interface over memory requests from an internal interface; and
- processing the memory request in response to the representation of the memory request being dequeued.

18. The non-transitory machine readable medium of claim 17, wherein the operations comprise:
- receiving the memory request; and
- writing the memory request into an entry of a directory data structure, the entry including an identifier of the entry, wherein storing the memory request in the queue includes using the identifier of the entry as the representation of the memory request in the queue.

19. The non-transitory machine readable medium of claim 18, wherein processing the memory request includes:
- using the identifier of the entry from the representation of the memory request that is dequeued to retrieve the memory request from the directory data structure; and
- executing the memory request to update the cache line.

20. The non-transitory machine readable medium of claim 17, wherein the multiple queues include a queue for each way of the cache line.

21. The non-transitory machine readable medium of claim 20, wherein the multiple queues include a queue that does not correspond to a present way of the cache line, called a common tag for the cache line.

22. The non-transitory machine readable medium of claim 21, wherein the multiple queues include a queue in each way and the common tag for each interface of a memory device.

23. The non-transitory machine readable medium of claim 22, wherein the defined order dequeues entries from:
- queues corresponding to an external interface to the memory device and a present way of the cache line before queues corresponding to an internal interface to the memory device and a present way; from the queues corresponding to the internal interface to the memory device and a present way before queues corresponding to the external interface and the common tag; and
- from the queues corresponding to the external interface and the common tag before queues corresponding to the internal interface and the common tag.

24. The non-transitory machine readable medium of claim 22, wherein each queue is a linked list, and wherein a head and tail pointer is stored for each list in the common tag or a tag corresponding to a way to which the queue corresponds.

* * * * *